United States Patent [19]

Wojcicki

[11] Patent Number: 5,285,769
[45] Date of Patent: Feb. 15, 1994

[54] AEROSOL GENERATING ROTARY PULSE-JET ORCHARD HEATER

[75] Inventor: Stanislaw Wojcicki, Pullman, Wash.

[73] Assignee: Washington State University Research Foundation, Pullman, Wash.

[21] Appl. No.: 961,175

[22] Filed: Oct. 13, 1992

[51] Int. Cl.[5] ............................................. A01G 13/06
[52] U.S. Cl. .................................. 126/59.5; 431/158; 431/1
[58] Field of Search ............... 431/1, 158; 126/59.5; 60/39.34, 39.35, 39.58, 247; 47/2

[56] References Cited

U.S. PATENT DOCUMENTS

| | | | |
|---|---|---|---|
| 1,317,959 | 10/1919 | Cobb | 126/59.5 X |
| 2,598,544 | 5/1952 | Holman et al. | 126/59.5 X |
| 2,653,655 | 9/1953 | Salmon | 126/59.5 X |
| 2,895,259 | 7/1959 | Beckett | 126/59.5 X |
| 3,017,367 | 1/1962 | Persechino | 126/59.5 |
| 3,055,144 | 9/1962 | Johnson et al. | 126/59.5 X |
| 3,377,743 | 4/1968 | Thompson et al. | 126/59.5 X |
| 3,645,250 | 2/1972 | Porter et al. | 126/59.5 |
| 5,010,872 | 4/1991 | Kish et al. | 126/59.5 |

FOREIGN PATENT DOCUMENTS 1186150  10/1985  U.S.S.R. .............................. 126/59.5

OTHER PUBLICATIONS

Spud Co., Inc. advertisement, Feb. 1992.

*Primary Examiner*—Carl D. Price
*Attorney, Agent, or Firm*—Wells, St. John, Roberts, Gregory & Matkin

[57] ABSTRACT

An orchard heater including a base and a pulse-jet engine rotatably mounted on the base. The pulse-jet engine exhausts a heated moisture-laden exhaust stream through an exhaust tube. The exhaust stream is directed tangentially to create a torque which automatically rotates the pulse-jet and causes lateral omnidirectional dispersion of the exhaust stream. The orchard heater utilizes the energy released from the combustion process to rotate the pulse-jet engine and to vaporize and atomize water.

5 Claims, 3 Drawing Sheets

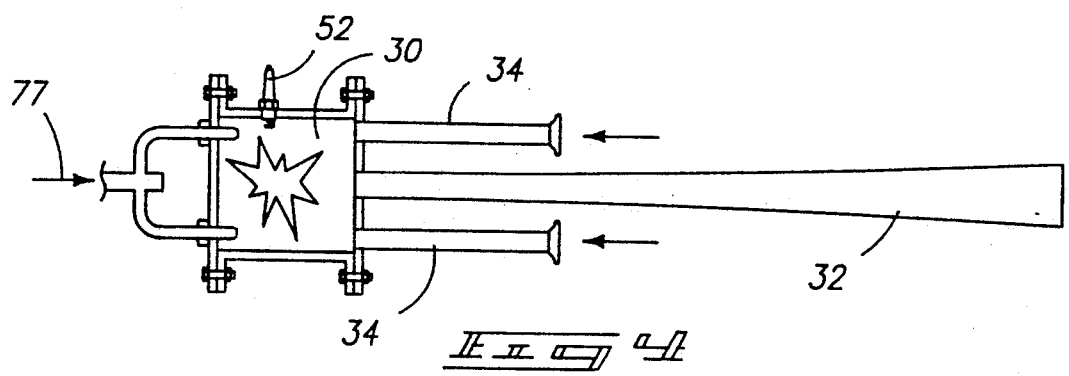
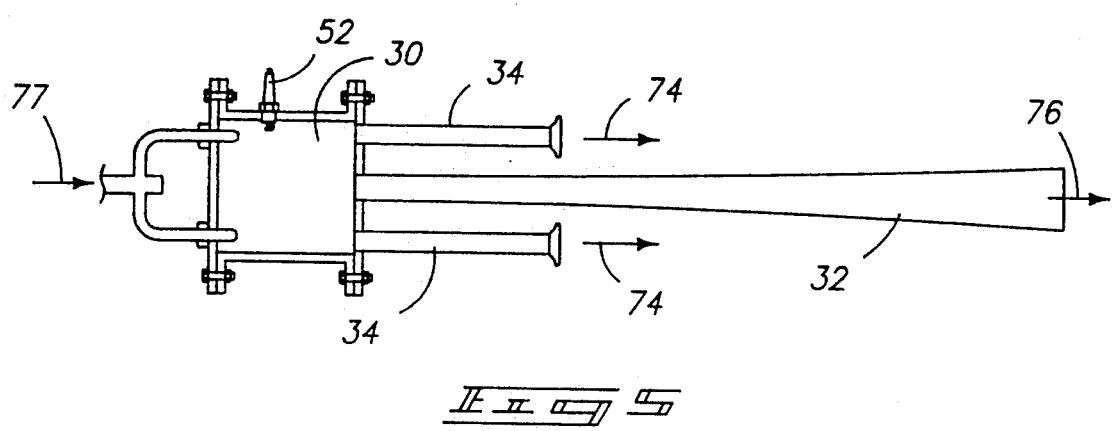
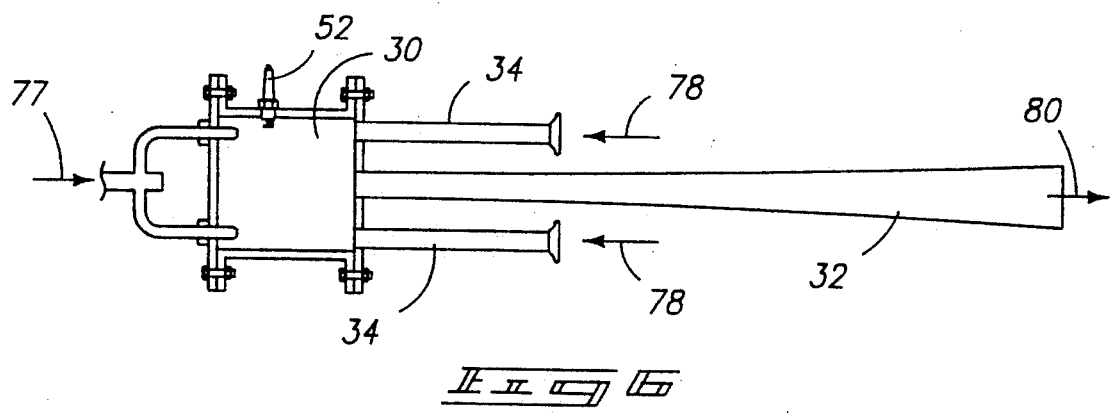
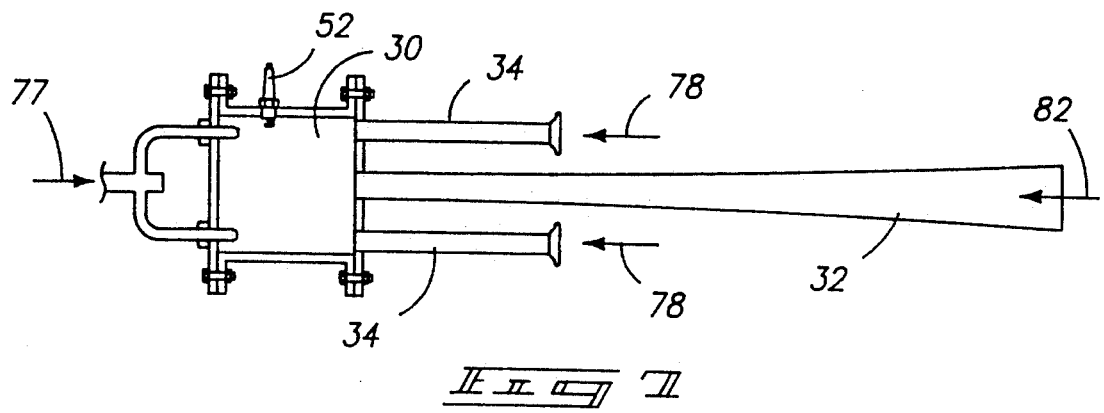

AEROSOL GENERATING ROTARY PULSE-JET ORCHARD HEATER

TECHNICAL FIELD

The field of this invention is heaters used in fruit tree and other orchards.

BACKGROUND OF THE INVENTION

Frost can cause extensive damage to agricultural products. Most vulnerable are fruit trees that blossom in early spring. Fruit that survives a frost can still be damaged or destroyed if the subsequent thaw is too rapid. Freeze damage problems cost millions of dollars each year, both in terms of lost profits to the farmer and in higher prices for the consumer.

To combat the destruction of frost, one of the early preventative measures was to use lighted smudge pots in the orchard. The smudge pot operates by burning oil in a container. The result is two-fold. First, heat is produced to offset the cold front and raise the temperature in the orchard to above dangerous levels. Second, smoke provides a blanket of insulation to retain the heat in the orchard. This blanket of smoke or mantle is referred to as "smudge". Modern smudge pots burn cleaner than earlier models but are still an environmental concern.

Another conventional technique is to spray water over the orchard or crops using an overhead irrigation system. The effectiveness of the air to trap and hold the earth's radiant heat increases with the dew point. Also, the condensation of the water vapor on the fruit releases energy (i.e., the heat of fusion), thus raising the temperature of the fruit. This method is seldom used, however, because there is a significant risk of damage to the trees from branches breaking under the load of frozen water. This approach to orchard freeze protection also is costly to install and operate because a water heater or boiler and large amounts of distribution piping are required.

A third technique used to combat the orchard frost problem is the wind machine. Propellers mounted on a ten to fifteen meter tower mix the air forcing cold air up and warm air down into the orchard. Helicopters have been employed for similar effects where the orchard is not equipped with wind machines.

This invention provides a new technique for preventing the formation of frost on fruit trees and other agricultural crops.

BRIEF DESCRIPTION OF THE DRAWINGS

One or more preferred embodiments of the invention are described below with reference to the following accompanying drawings.

FIGS. 4–7 diagrammatically illustrate sequential steps in the combustion process performed by the orchard heater shown in FIG. 1.

More specifically, FIG. 4 shows an initial step in the combustion process according to this invention.

FIG. 5 illustrates a step in the combustion process subsequent to the step illustrated in FIG. 4.

FIG. 6 illustrates a step in the combustion process subsequent to the step illustrated in FIG. 5.

FIG. 7 illustrates a step in the combustion process subsequent to the step illustrated in FIG. 6.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
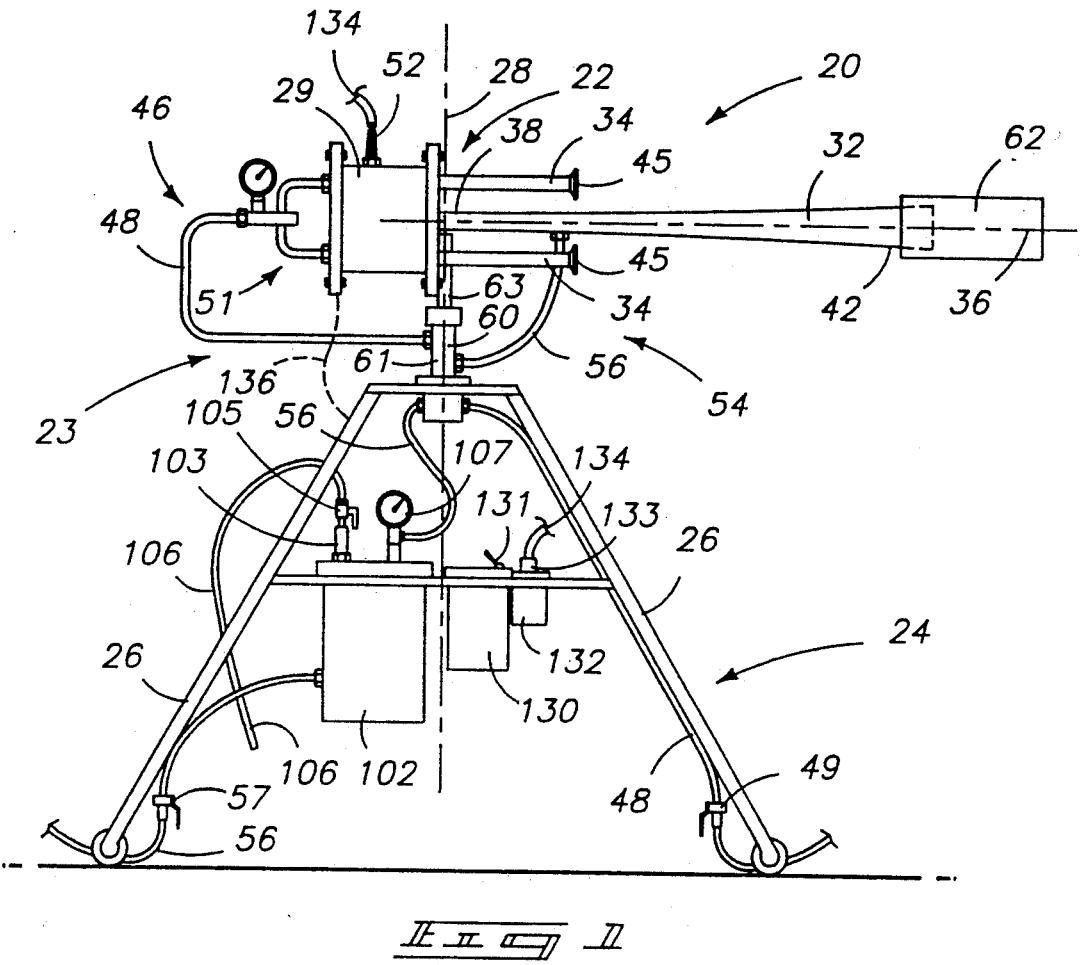
FIG. 1 is a side elevation view of an orchard heater constructed according to this invention.
Figure 2:
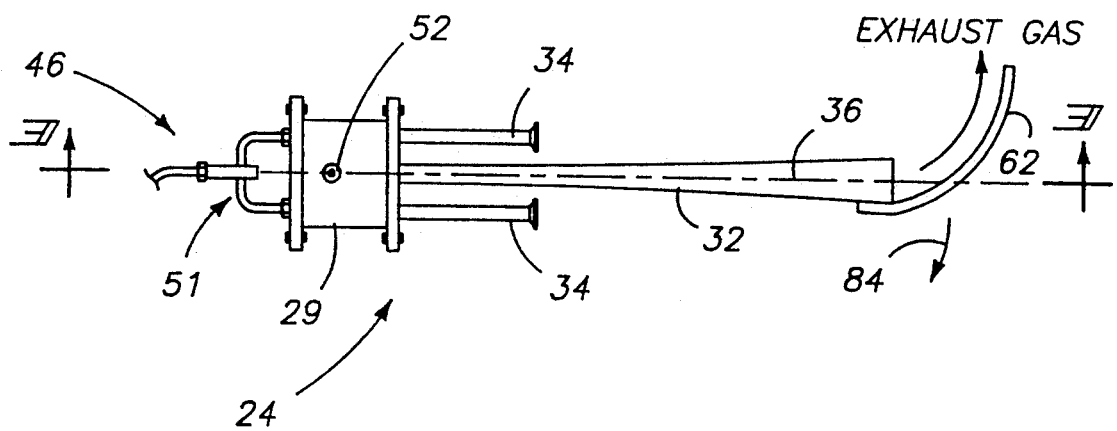
FIG. 2 is a top plan view of the FIG. 1 orchard heater.
Figure 3:
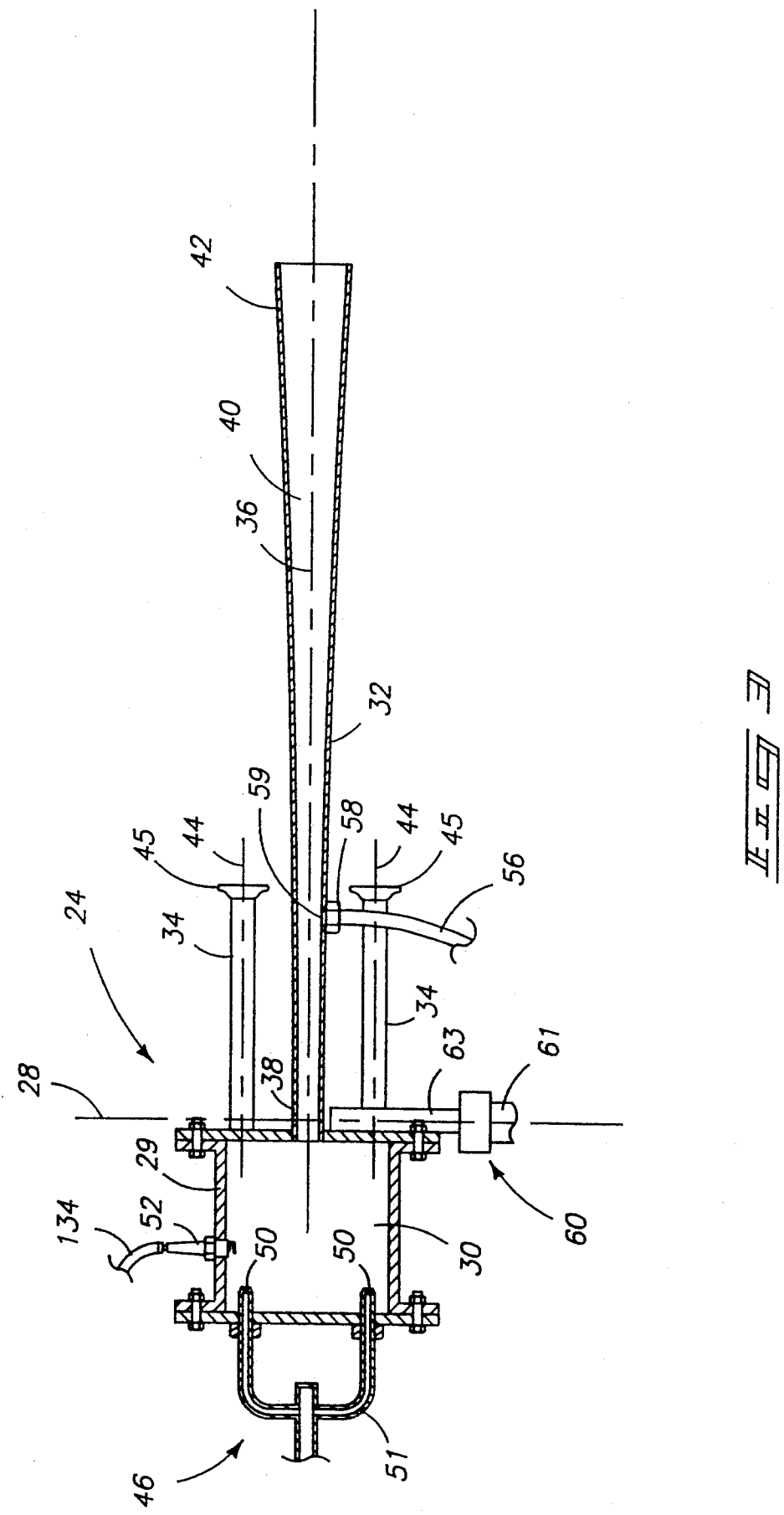
FIG. 3 is an enlarged partial cross-sectional view taken through lines 3—3 in FIG. 2. Portions have been removed for purposes of illustration.

FIGS. 1-3 illustrates an orchard heater 20 constucted according to a first embodiment of this invention. Orchard heater 20 includes a combustion system which is preferably in the form of a valveless, autoignition pulse-jet engine 22. Pulse-jet engine 22 generates individual bursts or pulses of heat over a pulse cyclic period. The pulse cycle period is typically of a duration corresponding to ignition pulse frequencies in the range of 20–200 Hz, and preferably approximately 100–150 Hz. The combustion products are in the form of a hot jet which is exhausted to the orchard to raise the temperature and prevent or reduce the risk of freeze damage to fruit trees or other similar crops.

Pulse-jet engine 22 includes a hollow combustion housing 29 having a combustion chamber 30. The combustion housing substantially contains and facilitates periodic combustion explosions or pulses. The combustion explosions or pulses are caused by autoignition of a mixture of air and fuel within the combustion chamber to generate the desired bursts or pulsed jet of heated gas and vapors. Four air inlet tubes 34 and an exhaust tube 32 are provided to permit communication of gases to and from the combustion chamber 30.

Exhaust tube 32 is a hollow, tubular member aligned along a longitudinal exhaust tube axis 36 (FIG. 3). Exhaust tube 32 provides an outlet port or aperture via exhaust tube interior passageway 40 for exhausting heat from combustion chamber 30. Exhaust tube 32 is preferably approximately three feet in length and has a first or proximal end 38 which is connected to combustion housing 29 and a second or distal end 42 which defines at extreme end an exit opening.

Pulse-jet 22 also includes a suitable air intake system. As shown, the air intake system is in the form of four air inlet tubes 34. Air inlet tubes 34 are hollow tubular members mounted to allow fluid communication with combustion chamber 30. Air inlet tubes 34 are preferably arranged in a spaced circular array around the axis 36 of exhaust tube 30. These tubes provide air passageways from chamber 30 to the environment. Air intake tubes 34 are preferably cylindrical and approximately 4–10 inches in length. The intake tubes are aligned along intake tube axes 44 (FIG. 3) which are substantially parallel to exhaust tube axis 36. The distal ends of the intake tubes can be provided with bell-shaped mouth pieces 45 to reduce fluid restriction and enhance flow of air into the intake tubes and combustion chamber.

The arrangement of exhaust tube 32 and air inlet tube 34 is advantageous as compared to other pulse-jet engines. The common design of pulse-jet engines is to arrange the exhaust and inlet tubes on opposing sides of the combustion chamber, and concentrically about a longitudinal axis. In this invention, however, the exhaust and air inlet tubes are arranged on the same side of the combustion chamber. The inflow paths defined by air coming in through the inlet tubes are generally in a direction opposite to the outflow path defined by the direction of flow of the exhaust gas stream flowing out through exhaust tube 32. As shown, the inflow and outflow paths are spaced and exist along different, but substantially parallel, inflow path axes. The inflow paths are substantially in a circular array about the outflow path. This arrangement provides improved thrust due to the combined action of the inflow and outflow streams through intakes 34 and outlet 32. The produced thrust is important for inducing the rotational movement, as is described below in more detail.

Orchard heater 20 includes a stand or base 24, which is preferably a tripod having legs 26 which are collapsible, telescoping or otherwise adjustable so as to allow adjustment of the stand or base to fit varying terrain topographies. Pulse-jet engine 22 and associated components form a rotor or rotating head 23. Rotor 23 is rotatably mounted on base 24 via a rotor mounting assembly 60 to allow rotation of the rotor about a vertical rotor axis 28.

Rotor mounting assembly 60 includes upper and lower rotational bearings (not shown) mounted with the assembly housing 61 and a rotor shaft 63. Upper and lower sections of the assembly both have two spaced annular flow passages between the housing 61 and rotor shaft 63 which communicate with inflowing and outflowing ports. The spaced annular regions are isolated using transversely positioned O-ring seals extending about the shaft, between the shaft and housing. Apertures (not shown), such as radially oriented holes, allow flow from the sealed annular spaces into and from the interior of the shaft. The shaft interior is provided with distinct flow passageways for the fuel and water. Similar seals and annular flow regions exist for the upper and lower ports. This allows fuel and water to be supplied to the rotor during rotation. This assembly provides relatively low friction rotation and communication of fuel and water. Alternative flow systems for communicating fluids to a rotor from a stationary base may also be acceptable.

Pulse-jet engine 22 is oriented relative to base 24 such that exhaust tube axis 36 and air intake tube axes 44 are substantially perpendicular to vertical axis 28. Pulse-jet engine 22 rotates about rotational axis 28 jetting heat outwardly in an approximately circular lateral exhaust dispersion pattern which is laterally omnidirectional to direct heat laterally and in all directions from the orchard heater.

Orchard heater 20 includes a fuel supply system 46 for providing a combustible fuel, preferably propane or other gaseous fuel, to combustion chamber 30. Fuel supply system 46 has a hose or conduit line 48 which transfers the fuel from an external source (not shown). A fuel valve 49 is preferably disposed in line 48 to control the flow of fuel to pulse-jet engine 22. Line 48 supplies fuel to the rotor mounting assembly 60 which includes a sealed fluid passageway for communicating fuel therethrough during rotation of the rotor. Fuel line 48 continues from the assembly 60 toward the combustion chamber. A fuel distribution manifold 51 is advantageously used to branch the fuel flow into a suitable number of branch lines for supplying the individual fuel inlets to combustion chamber 30. The fuel inlets to the combustion chamber are advantageously in the form of fuel injection nozzles 50 (FIG. 3) positioned to dispense fuel into the interior of combustion chamber 30. The exact positioning of the nozzle tips is adjusted to facilitate the combustion process.

Orchard heater 20 is also provided with an ignition system to initiate operation of the pulse-jet engine 22. The ignition system is used solely to start the engine and is not needed otherwise during operation. Normal operation is according to an autoignition process described more fully hereinafter. As shown, the ignition system for pulse-jet engine 22 has an ignitor which is preferably in the form of a spark plug 52 mounted in a side wall of combustion housing 29. The ignitor is supplied with an electrical discharge to produce a spark within the combustion chamber and thereby initiate combustion. The electrical discharge can be supplied from an electrical storage battery 130. Electrical current is controllably switched by an ignition switch 131. When closed, the ignition switch allows current to flow to a condenser (not shown) and through an electrical coil 132. An outlet terminal 133 is connected to an ignition supply conductor 134 which carries the current to the electrode of spark plug 52. The ignition supply conductor is only temporarily connected to the spark plug 52 during the startup process. A ground wire 136 is also temporarily clipped or otherwise connected between the combustion housing 29 and the frame of the base during ignition to complete the ignition circuit. Ground connector 136 also assures ground current passes around the rotor mounting assembly 60 to reduce the risk of undesired ignition of the fuel passing therethrough. After the pulse-jet has started, conductors 134 and 136 are disconnected and the rotor assembly is manually released or otherwise freed to rotate.

Orchard heater 20 further includes a moisture supply system 54 which injects moisture into the exhaust gas stream emitted from exhaust tube 32. As shown, moisture supply system 54 includes a water supply conduit 56 which passes water to the pulse-jet engine 22 from an external source (not shown), such as a hose bib. A water supply cutoff valve 57 is provided to control basic flow of water to a water reservoir 102. Water reservoir 102 is provided with an overflow port 103 which is connected to an overflow adjustment valve 105. An overflow tube 106 extends from the outflow of valve 105. Valve 105 is adjusted to increase or decrease overflow in order to allow easy adjustment of the water pressure supplied to pulse-jet engine 22. A water supply pressure gauge 107 is advantageously connected to reservoir 102 to provide an indication of the pressure supplied through the outflowing water supply line 56 connected between reservoir 102 and the rotor mounting assembly 60.

Moisture supply system 54 also has an injection nozzle 58 (see FIG. 3) mounted to supply the water or other suitable moisture fluid to the exhausting gas stream conveyed through exhaust tube 32. This is preferably done by passing the water through a water injection nozzle 59 to produce a fine mist spray into exhaust passageway 40 of exhaust tube 32. The pulse-jet produces a pulsating flow which enhances atomization and vaporization of the water. The moisture supply system increases the water content of the exhaust gas stream used to heat the orchard. The increased water content of the exhaust gas stream increases the density of the hot exhaust gases, thus causing the exhaust gases to have a greater tendency to disperse within the orchard at a relatively low elevation stratum which encompasses the trees and which lies at or near the ground. The water injection lowers temperature which reduces convective elevation increase of the exhausted moisture-laden stream. These factors also reduce atmospheric mixing and minimize the heat required to keep the trees from dropping to freezing temperatures.

Orchard heater 20 also includes a suitable means for rotating the exhaust jet or stream emitted from the pulse-jet engine 22. This is preferably done by producing a jet which produces a rotational moment or torque about the rotational axis 28 of the rotating assembly. This is advantageously accomplished using an exhaust director or deflector 62 mounted near the distal end 42 of exhaust tube 32. FIG. 2 shows that fin 62 is shaped to direct the exhausting gas stream in a tangential direction to develop a torque upon the rotor about the rotational axis 28. The deflector is advantageously curved from the exhaust tube outlet opening to define a curved exhaust stream jet path exiting from exhaust tube 32. The fluid dynamic action of the exhausting jet stream against deflector 62 causes rotational movement of the rotor relative to base 24. The rotor rotates in a direction illustrated by arrow 84. The rotor can rotate at various speeds, such as 0.1-1 cycle per second.

The deflector and exhaust jet effectively utilize energy from the pulse-jet engine, thereby providing a self-propelling rotary action. A separate rotational motor and coupling system for rotating the pulse-jet engine is not necessary. This construction also causes the hot exhaust gas stream to be continuously dispersed in a lateral direction about an entire 360° range thus providing laterally omnidirectional dispersion of the heated exhaust stream. This omnidirectional dispersion of the heated exhaust stream allows the orchard heater to effectively heat a relatively large area because the heat is more evenly dispersed.

The preferred operation of orchard heater 20 will now be described with reference primarily to FIGS. 4-7. The combustion process is cyclical, and FIG. 4 illustrates an arbitrarily selected beginning phase in this cycle. In this phase, a combustible mixture of air and fuel are already provided within combustion chamber 30. The cycle begins with the ignition of the combustible mixture within chamber 30 using spark plug 52, as controlled by the ignition switch 130. As the combustible mixture burns, pressure in combustion chamber 30 increases, forcing combustion products (as illustrated in FIG. 5 by arrows 74 and 76) out through exhaust tube 32 and air intake tubes 34.

The outflow through the exhaust tube 32 is substantially greater because of the larger size of the exhaust conduit relative to the intake conduits. The inertia of the exhausting gases contained in the greater flow from the exhaust tube at some point become sufficient to cause a negative pressure to be developed within the combustion chamber. This evacuation within combustion chamber 30 reverses the flow in the intake tubes 34 so that fresh air is drawn in through air intake tubes 34, as illustrated in FIG. 6 by arrows 78. For a brief portion of the cycle, air may be sucked into the exhaust tube 32 (as illustrated in FIG. 7 by arrow 82).

During the process steps described above, fuel is continuously provided through injection nozzles 50 (as illustrated by arrow 77) into the combustion chamber. Thus a new charge of fresh air and fuel is formed as the fresh air enters through tubes 34. The heat of the combustion chamber housing 29 is sufficient to ignite the new charge of fuel and air, as shown in FIG. 4. This process repeats and provides a cyclical autoignition process which supplies a pulsating exhaust jet stream from the distal end of exhaust barrel 32.

In this manner, pulse-jet engine 22 generates hot combustion products which are primarily exhausted out through exhaust tube 32 along the exhaust path. This exhausting jet impacts against deflection fin 62 to cause a rotation of pulse-jet engine 22 about central axis 28 in the direction illustrated by arrow 84 in FIG. 2.

An exemplary orchard heater 20 has an overall length from the rotational axis 28 to the tip of deflector 62 equal to approximately 1400 millimeters. The outlet tube 32 is approximately 50 millimeters in diameter at its proximal end 38 connected to the combustion housing 29. The diameter of the outer or distal end 42 of the exhaust tube 32 is approximately double the inner end diameter. In such a machine, propane is advantageously supplied at a flow rate in the approximate range of 6-12 kilograms per hour, and most preferably 8 kilograms per hour. Fuel pressures for the preferred fuel propane are preferably in the approximate range 0.25-0.7 atmospheres, and most preferably 0.3 atmospheres. Water is advantageously supplied at a flow rate in the approximate range of 0-50 kilograms per hour, and preferably 20 kilograms per hour. Water or other suitable moisture supply fluid is advantageously provided at pressures ranging 0-1 atmospheres, and most preferably 0.4 atmospheres.

Orchard heater 20 possesses four characteristics advantageous to prevention of frost formation in orchards. First, heat is generated to raise the temperature of the air within a atmospheric stratum containing the trees and adjacent to the ground, thus reducing or preventing frost formation. Second, to avoid fast convection of heat above the required stratum, water is injected into the exhaust stream to reduce temperature of the exhaust stream to the appropriate level. Third, the thrust generated by the exhaust gas stream is also harnessed to rotate the heating system providing automatic omnidirectional dispersion of the orchard-warming gases. Fourth, fuel intake and air intake is automatically provided using a simple autoignition cycle.

The invention functions as a combustion driven autocyclomaton. The four traits of autocyclomata include: (1) lack of controlling moving parts; (2) feedback controlled cyclic operation; (3) self-regulation of the feedback processes; and (4) wholeness. Wholeness in this sense means that each process is not isolated from the entire or overall operation of the system. The orchard heater is self-regulating and self-propelled in that the combustion process controls the rotation of the pulse-jet engine.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An orchard heater comprising:
   a base;
   a rotor mounted for free rotation upon the base about an upstanding rotor axis of rotation;
   a pulse-jet engine having an intake, a combustion chamber, and an exhaust tube with an outlet port through which exhaust gases are emitted; said pulse-jet engine being mounted upon the rotor for rotation therewith about the upstanding rotor axis of rotation; the pulse-jet engine generating a heated exhaust stream which is jetted from the exhaust tube along an exhaust jet path which is directed laterally with respect to the axis of rotation;

a rotary fuel supply means for providing a fuel to the combustion chamber from the base without preventing free rotation of the rotor;

a water injector mounted in the exhaust tube of the pulse-jet engine to inject water thereinto to cool the exhaust gases and create an air-water aerosol which is emitted from the outlet port of the exhaust tube;

a rotary water supply means for providing water to the water injector from the base without preventing free rotation of the rotor;

an exhaust director means for directing the exhaust stream to develop a torque which turns the rotor relative to the base to provide laterally omnidirectional dispersion of the heated exhaust stream to thereby heat areas around the orchard heater with a moderate temperature air-water aerosol.

2. An orchard heater according to claim 1 wherein the exhaust director includes an exhaust deflector attached to the exhaust tube.

3. An orchard heater according to claim 1 wherein the exhaust director includes an exhaust deflector attached to the distal end of the exhaust tube; said exhaust deflector including a curved piece against which the exhaust stream impinges and is redirected to produce said torque.

4. An orchard heater according to claim 1 and further comprising:

a water reservoir mounted upon the base; and, a water control valve the base for adjusting the water flow rate to the water injector.

5. An orchard heater according to claim 1 and further comprising an ignition system to allow starting ignition of the heater.

* * * * *